United States Patent
Bridger et al.

(10) Patent No.: US 7,257,642 B1
(45) Date of Patent: Aug. 14, 2007

(54) CHANNEL LOAD BALANCING

(75) Inventors: Jacob Bridger, Misgav (IL); Arnon Netzer, Givat-Ella (IL); Amnon Gavish, Bikaat-Beit-Hakerem (IL)

(73) Assignee: Surp Communication Solutions Ltd., Yokneam (IL)

( * ) Notice: Subject to any disclaimer, the term of this patent is extended or adjusted under 35 U.S.C. 154(b) by 388 days.

(21) Appl. No.: 10/129,743

(22) PCT Filed: Nov. 1, 2000

(86) PCT No.: PCT/IL00/00703

§ 371 (c)(1),
(2), (4) Date: May 9, 2002

(87) PCT Pub. No.: WO01/35575

PCT Pub. Date: May 17, 2001

Related U.S. Application Data

(63) Continuation-in-part of application No. 09/501,078, filed on Feb. 9, 2000.

(30) Foreign Application Priority Data

Nov. 11, 1999 (IL) .................................. 132888
May 9, 2000 (IL) ....................... PCT/IL00/00266

(51) Int. Cl.
*G06F 15/173* (2006.01)

(52) U.S. Cl. ................... 709/238; 709/203; 709/219; 709/226; 709/228; 709/243; 370/328; 370/395.21; 370/395.31; 370/295.42; 370/444; 370/461

(58) Field of Classification Search ............... 709/239, 709/241, 243, 203, 219, 240, 226, 228, 238, 709/217, 227, 201; 370/328, 444, 461, 395.21, 370/395.31, 395.42
See application file for complete search history.

(56) References Cited

U.S. PATENT DOCUMENTS

| 4,827,499 | A | | 5/1989 | Warty et al. |
| 4,965,641 | A | | 10/1990 | Blackwell et al. |
| 4,974,256 | A | | 11/1990 | Cyr et al. |
| 5,287,461 | A | * | 2/1994 | Moore ........................ 709/219 |
| 5,349,682 | A | | 9/1994 | Rosenberry |
| 5,412,656 | A | | 5/1995 | Brand et al. |

(Continued)

FOREIGN PATENT DOCUMENTS

EP 0 491 489 6/1992

(Continued)

OTHER PUBLICATIONS

Eyuboglu, V.M. et al.; "AdvancedModulation Techniques for V. Fast;" May-Jun. 1993; pp. 243-256; European Trans. On Telecomm. and Related Tech.; vol. 4; No. 3.

(Continued)

*Primary Examiner*—Micheal Y. Won
(74) *Attorney, Agent, or Firm*—Yaakov Schatz; Factor Patent Attorneys

(57) ABSTRACT

A method of channel routing. The method includes receiving an incoming connection, determining an amount of processing resources required to handle the incoming connection, and selecting a remote access server to handle the incoming connection, responsive to the determined amount of processing resources.

23 Claims, 1 Drawing Sheet

U.S. PATENT DOCUMENTS

| | | | | |
|---|---|---|---|---|
| 5,446,730 | A * | 8/1995 | Lee et al. | 370/351 |
| 5,546,388 | A | 8/1996 | Lin | |
| 5,546,456 | A | 8/1996 | Vilsoet et al. | |
| 5,590,345 | A | 12/1996 | Barker et al. | |
| 5,598,536 | A * | 1/1997 | Slaughter et al. | 709/219 |
| 5,649,108 | A * | 7/1997 | Spiegel et al. | 709/241 |
| 5,687,167 | A * | 11/1997 | Bertin et al. | 370/254 |
| 5,701,482 | A | 12/1997 | Harrison et al. | |
| 5,721,830 | A | 2/1998 | Yeh et al. | |
| 5,729,542 | A * | 3/1998 | Dupont | 370/346 |
| 5,748,629 | A | 5/1998 | Caldara et al. | |
| 5,774,668 | A * | 6/1998 | Choquier et al. | 709/223 |
| 5,790,533 | A | 8/1998 | Burke et al. | |
| 5,790,534 | A | 8/1998 | Kokko et al. | |
| 5,790,781 | A | 8/1998 | Cox et al. | |
| 5,794,058 | A | 8/1998 | Resnick | |
| 5,799,064 | A | 8/1998 | Sridhar et al. | |
| 5,805,827 | A * | 9/1998 | Chau et al. | 709/247 |
| 5,809,066 | A | 9/1998 | Suomi et al. | |
| 5,828,847 | A * | 10/1998 | Gehr et al. | 709/239 |
| 5,852,655 | A | 12/1998 | McHale et al. | |
| 5,881,050 | A * | 3/1999 | Chevalier et al. | 370/230 |
| 5,892,818 | A | 4/1999 | Lee | |
| 5,896,376 | A | 4/1999 | Alperovich et al. | |
| 5,896,386 | A | 4/1999 | Johnston | |
| 5,905,725 | A | 5/1999 | Sindhu et al. | |
| 5,909,384 | A | 6/1999 | Tal et al. | |
| 5,920,599 | A | 7/1999 | Igarashi | |
| 5,925,114 | A | 7/1999 | Hoang | |
| 5,931,950 | A | 8/1999 | Hsu | |
| 5,935,249 | A * | 8/1999 | Stern et al. | 713/201 |
| 5,940,459 | A | 8/1999 | Hsu et al. | |
| 5,949,977 | A * | 9/1999 | Hernandez | 709/229 |
| 5,960,035 | A | 9/1999 | Sridhar et al. | |
| 5,982,750 | A | 11/1999 | Tabe et al. | |
| 5,982,776 | A | 11/1999 | Manning et al. | |
| 5,982,814 | A | 11/1999 | Yeh et al. | |
| 5,983,282 | A * | 11/1999 | Yucebay | 709/249 |
| 5,987,135 | A * | 11/1999 | Johnson et al. | 709/224 |
| 5,995,540 | A | 11/1999 | Draganic | |
| 5,999,809 | A | 12/1999 | Watanabe | |
| 6,006,318 | A | 12/1999 | Hansen et al. | |
| 6,070,192 | A * | 5/2000 | Holt et al. | 709/227 |
| 6,088,732 | A * | 7/2000 | Smith et al. | 709/229 |
| 6,112,243 | A * | 8/2000 | Downs et al. | 709/226 |
| 6,148,006 | A | 11/2000 | Dyke et al. | |
| 6,154,445 | A * | 11/2000 | Farris et al. | 370/237 |
| 6,160,843 | A | 12/2000 | McHale et al. | |
| 6,161,201 | A * | 12/2000 | Payne et al. | 714/43 |
| 6,163,599 | A | 12/2000 | McHale | |
| 6,181,694 | B1 * | 1/2001 | Pickett | 370/353 |
| 6,185,698 | B1 * | 2/2001 | Wesley et al. | 714/18 |
| 6,226,277 | B1 * | 5/2001 | Chuah | 370/328 |
| 6,307,836 | B1 * | 10/2001 | Jones et al. | 370/230 |
| 6,349,123 | B1 | 2/2002 | Kim | |
| 6,360,263 | B1 * | 3/2002 | Kurtzberg et al. | 709/226 |
| 6,385,203 | B2 | 5/2002 | McHale et al. | |
| 6,411,617 | B1 * | 6/2002 | Kilkki et al. | 370/353 |
| 6,457,037 | B1 | 9/2002 | Maytal | |
| 6,466,976 | B1 * | 10/2002 | Alles et al. | 709/224 |
| 6,473,781 | B1 * | 10/2002 | Skagerwall et al. | 709/201 |
| 6,490,287 | B1 * | 12/2002 | Kilkki | 370/395.42 |
| 6,516,350 | B1 * | 2/2003 | Lumelsky et al. | 709/226 |
| 6,523,065 | B1 * | 2/2003 | Combs et al. | 709/226 |
| 6,553,376 | B1 * | 4/2003 | Lewis et al. | 707/10 |
| 6,577,871 | B1 | 6/2003 | Budka et al. | |
| 6,603,745 | B1 | 8/2003 | Antonio et al. | |
| 6,614,794 | B1 | 9/2003 | Adas et al. | |
| 6,631,354 | B1 * | 10/2003 | Leymann et al. | 705/8 |
| 6,667,972 | B1 * | 12/2003 | Foltan et al. | 370/354 |
| 6,711,159 | B1 * | 3/2004 | Grabelsky et al. | 370/353 |
| 6,714,532 | B1 * | 3/2004 | Kawaguchi | 370/351 |
| 6,741,572 | B1 * | 5/2004 | Graves et al. | 370/254 |
| 6,907,462 | B1 * | 6/2005 | Li et al. | 709/226 |
| 6,963,551 | B2 | 11/2005 | Uebayashi et al. | |

FOREIGN PATENT DOCUMENTS

| | | |
|---|---|---|
| EP | 0 831 624 | 3/1998 |
| EP | 0 859 492 | 8/1998 |
| EP | 0 913 770 | 5/1999 |
| WO | WO98/54868 | 12/1998 |
| WO | WO99/06913 | 2/1999 |
| WO | WO99/20033 | 4/1999 |
| WO | WO99/39530 | 8/1999 |
| WO | WO 00/11843 | 3/2000 |

OTHER PUBLICATIONS

Forney, D. G. Jr. et al.; "The V.34 High-Speed Modem Standard;" Dec. 1996; pp. 28-33; IEEE Communications Magazine.

Crovella, M. E. et al. for USENIX; Abstracts "Connection Scheduling in Web Servers;" last changed Sep. 23,1999; 1 page retrieved from the internet on Jan. 30, 2002 <http://www.usenix.org./events/usits99/crovella.html>.

Gopalakrishan, R. et al.; "Efficient User-Space Protocol Implementations with QoS Guarantees Using Real-Time Upcalls;" Aug. 4, 1998; pp. 374-388; IEEE/ACM Transactions on Networking; vol. 6; No. 4; XP000771968.

Held, G; "the Complete Modern Reference;" John Wiley and Sons; pp. 260-262; XP002153737.

MacVittie, D. for Sun.com; "Best Practices How-Tos: Tuning your iPlanet[tm]Web Server;" Nov. 19, 2001; pp. 1-7; retrieved from the internet on Jan. 24, 2002 <http://dcb.sun.com/practices/howtos/tuning_iplanet.jsp>.

Newton's Telecom Dictionary, the Official Dictionary of Telecommunications & the Internet; 15th Updated, Expanded and Much Improved Edition; Feb. 1999; pp. 645, 660; "RAC-Remote Access Concentrator" and "Remote Access Server".

Zeus Technology Inc.; Zeus Load balancer v1.4; Chapter 1—Sizing Guide; retrieved from the internet on Jan. 24, 2002 http://support.zeus.com/doc/zlb/sizing_guide.pdf.

"T.38"; ITU-T Telecommunication Standardization Sector of ITU; Jun. 18, 1998; XP002163782.

Gieseler, S.; "Tunnelbau. Remote-Access-Server als Basis für Virtual Private Networks;"Net—Zeitshrift Fuer Kommunikationsmanagement, Huthbig Verlag; vol. 52; No. 8/9; 1998; pp. 38-40; XP000782761.

Draft ETSI EN 301 344 V.7.4.0 (Apr. 2004; GSM 03.60 version 7.4.0; Release 1998; pp. 11-30.

"Evolution Toward Third Generation Wireless Networks"; pp. 1-17; last modified Nov. 21, 1999; downloaded on 2/7/2000; retrieved from the Internet <http://www.cis.ohio-state.edu/~jain/cis788-99/3g_wireless/index.html>.

* cited by examiner

CHANNEL LOAD BALANCING

RELATED APPLICATIONS

This application is a U.S. national filing of PCT Application No. PCT/IL00/00703, filed Nov. 1, 2000. This application is also a continuation-in-part of U.S. application Ser. No. 09/501,078, filed Feb. 9, 2000, the disclosure of which is incorporated herein by reference.

FIELD OF THE INVENTION

The present invention relates to communication systems and in particular to systems for handling remote access connections.

BACKGROUND OF THE INVENTION

Many providers of communication services employ a plurality of remote-access servers, such as modems, Fax handlers and voice Internet Protocol (VoIP) services connected to telephone switches. A channel router receives incoming communication requests and determines which remote-access server is to handle each incoming request. Some remote access servers are multi-channel servers which have a capacity to handle concurrently a plurality of connections up to a predetermined maximal number. In addition, some remote-access servers which are implemented mainly in software, such as the Surf Multi-access Pool (SMP) from Surf Communication Solutions Ltd., and servers 3Com, Ascend, Access, ADI, Connexent, Telogy, and Hothaus, can handle different types of connections concurrently.

When an incoming connection is received by the channel router, the router finds a remote-access server which can handle the type of the incoming connection and which is handling less than the maximal number of connections of its capacity. If no such server is found, a busy signal is returned in response to the incoming connection.

The processing power required for handling a single connection depends on the type of the connection. For example, handling a modem connection usually requires more processing power than a Fax connection, and therefore a multi-channel multi-connection-type remote access server can handle concurrently different numbers of connections according to the types of the connections. In some cases, the exact processing power needed to handle a connection is not known until the handling of the connection actually begins. In order not to overload a server beyond its capacity, existing channel routers usually assume conservative numbers for the number of channels which can be handled concurrently by a multi-channel server, for example, assuming that all the connections the server handles require a maximal processing power required by any connection. This causes waste in the usage of the multi-channel remote access servers in a multi-service system. This waste, however, provides additional assurance that the servers will be able to handle the connections they are assigned.

SUMMARY OF THE INVENTION

An aspect of some embodiments of the present invention relates to a channel router which routes incoming connections to multi-access servers based on the actual processing resources (e.g., processing power, memory) required for the connection and the available resources of the servers. Possibly, the channel router keeps track not only of the number of connections handled at any specific moment by each remote access server, but of the type of the connections and/or the resources that these connections require. Alternatively or additionally, the channel router is constantly updated by the remote access servers of their available unused resources, or of data from which the amount of available resources may be determined. Accordingly, the channel router selects, for each incoming connection, a server which handles the connection. The selection is possibly performed in a manner which maximizes the number of connections which are handled concurrently by the system. In some embodiments of the invention, the selection is performed using packing theory algorithms.

An aspect of some embodiments of the present invention relates to a channel router which keeps track of the processing resources of the remote access servers by receiving from at least some of the servers updates relating to the available resources of the servers. Possibly, the updates state the unused processing resources of the servers. Alternatively or additionally, the updates state the numbers and/or types of connections currently being handled by the servers.

In some embodiments of the present invention, the router re-routes connections between servers while the connections are in progress. In some cases an incoming connection requires an amount of resources which is not available on any of the servers but is available on two or more servers together. Possibly, the router re-routes one or more connections which require less resources than the incoming connection between the servers in order to make a single server have sufficient resources to handle the incoming connection.

There is therefore provided in accordance with an embodiment of the present invention, a method of channel routing, including receiving an incoming connection, determining an amount of processing resources required to handle the incoming connection, and selecting a remote access server to handle the incoming connection, responsive to the determined amount of processing resources. Possibly, determining the amount of processing resources includes determining an amount of processing power and/or an amount of memory.

Possibly, determining the amount of processing power includes selecting an amount of processing power from a look up table. Alternatively or additionally, determining the amount of processing resources includes determining a plurality of suitable combinations of resources. Possibly, determining the amount of processing resources includes determining responsive to a type of the received incomimg connection and/or to a quality of service of the received incoming connection.

Possibly, determining the amount of processing resources includes determining separately for each remote access server responsive to capabilities of the remote access server.

Possibly, selecting the remote access server includes determining an amount of available processing resources for each of a plurality of remote access servers.

Possibly, determining the amount of available processing resources for each of the remote access servers includes receiving indications of the available processing power from the remote access servers. Possibly, receiving indications of the available processing resources includes receiving indications periodically irrespective of the receiving of the incoming connection. Possibly, determining the amount of available processing resources for each of the remote access servers includes keeping track of the assignment of connections to be handled by the servers. Possibly, selecting the remote access server includes selecting based on packing theory. Possibly, selecting the remote access server includes selecting according to a priority of the received incoming connection.

Possibly, the method includes requesting from the selected remote access server to lower the amount of processing resources assigned to one or more currently handled connections in order to vacate resources for the received incoming connection.

There is further provided in accordance with some embodiments of the present invention, a method of managing a plurality of remote access servers by a channel router, including receiving by the channel router from at least one of the remote access servers, data on the current usage of the server, and determining available processing resources of the at least one server responsive to the received data.

Possibly, receiving the data includes receiving indication of the available processing power. Possibly, receiving the data includes receiving data on of the connections currently handled by the server. Possibly, receiving the data includes receiving an indication of the number of connections currently handled by the server. Possibly, receiving the data includes receiving the data periodically. Possibly, receiving the data periodically includes receiving at periods determined responsive to attributes of the servers sending the updates. Possibly, receiving the data includes receiving the data responsive to prompting the servers for the data.

There is further provided in accordance with some embodiments of the present invention, a method of channel routing, including receiving an incoming connection, selecting a remote access server to handle the incoming connection, and instructing the selected remote access server to reduce the amount of processing resources assigned to one or more currently handled connections of the server in order to vacate resources for the received incoming connection.

There is further provided in accordance with some embodiments of the present invention, a switch system which handles incoming connections, including a plurality of remote access servers, and a channel router which determines for each incoming connection an amount of processing resources required to handle the incoming connection and which selects one of the remote access servers to handle the connection, responsive to the determined amount of processing resources.

Possibly, the plurality of remote access servers includes at least one software based server. Possibly, the plurality of remote access servers includes at least one server which can handle connections of a plurality of different types. Possibly, at least one of the plurality of remote access servers sends updates relating to the available resources of the at least one server to the channel router.

Possibly, the channel router manages a table of the available resources of each of the plurality of servers. Possibly, at least one of the servers includes an array of servers managed by an internal channel router.

BRIEF DESCRIPTION OF FIGURES

The invention will be more clearly understood by reference to the following description of embodiments thereof in conjunction with the figures, in which.

DETAILED DESCRIPTION OF EMBODIMENTS

Figure 1:
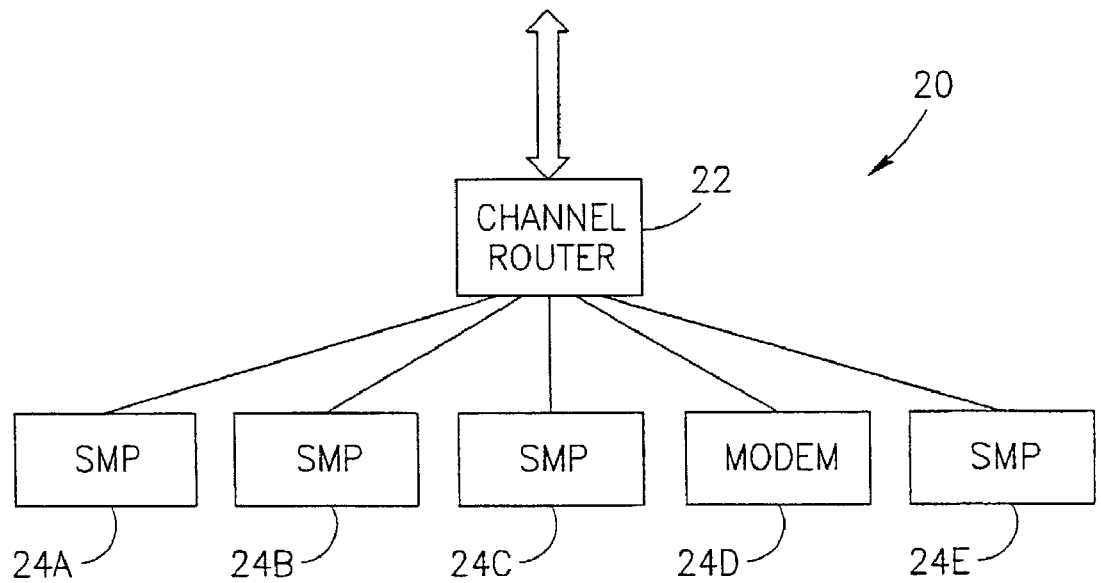
FIG. 1 is a schematic illustration of an automatic connection handling system, in accordance with an exemplary embodiment of the present invention.

FIG. 1 is a schematic illustration of an automatic connection handling system 20, in accordance with an exemplary embodiment of the present invention. System 20 comprises a plurality of remote-access servers 24 and a channel router 22 which directs incoming connections to specific servers 24. Servers 24 may be of any type known in the art including single channel and multi-channel servers, servers which can handle one type of connection and servers which can handle a plurality of connections and both software based and hardware based servers. Servers 24 included in system 20 may all be of the same type or may be of different types, and may have the same or different processing resources. Optionally, servers 24 which process a plurality of connections may have a single processing cycle time in which all the handled connections must be processed or may have different processing cycle times for different handled connections, for example as described in U.S. patent application Ser. No. 09/501,078, filed Feb. 9, 2000, the disclosure of which is incorporated herein by reference. In some embodiments of the invention, at least some of servers 24 are multi-channel servers which can handle a plurality of different connection types. Servers 24 may be located within a single box or may be located in a plurality of separate locations.

In some embodiments of the invention, a server 24 may comprise an array of a plurality of servers connected by a router, such as a router 22 in accordance with any of the embodiments of the present invention or any router known in the art. Thus, routers 22 may be implemented in a hierarchy of routers and servers.

Table 1 is an example of a table of servers 24 in system 20 managed by channel router 22, in accordance with an embodiment of the present invention. For each remote access server 24, channel router 22 possibly lists information on the capabilities of the server, such as the types of connections the server can handle (line 1). For multi-channel multi-connection-type servers, such as software based servers, the table possibly also lists the total processing resources of the server (lines 2, 3 and 4). For other servers, the table possibly lists the number of connections which can be handled concurrently by the server (line 2, server D).

TABLE 1

|  | server A | server B | server C | server D | server E |
| --- | --- | --- | --- | --- | --- |
| 1) types of connections | All connections | All connections | All connections | Modem | All connections |
| 2) processing power | 100 MIPS | 200 MIPS | 100 MIPS | 2 connections | 70 MIPS |

TABLE 1-continued

|  | server A | server B | server C | server D | server E |
|---|---|---|---|---|---|
| 3) memory | 1 Mbyte | 0.5 Mbyte | 1 Mbyte |  | 1 Mbyte |
| 4) Bandwidth | 128 slots | 128 slots | 64 slots |  | 64 slots |
| 5) list of currently handled connections | FAX 0172<br>Modem 8124<br>voice 0017 | modem 6203<br>modem 2593 | modem 6103<br>modem 4830<br>voice 0912 | modem 3679 | Fax 7111 |
| 6) available resources | 37 MIPS<br>165 Kbytes<br>23 slots | 150 MIPS<br>8 Kbytes<br>87 slots | 25 MIPS<br>100 Kbytes<br>4 slots | 1 connection | 50 MIPS<br>700 Kbytes<br>39 slots |

Possibly, channel router 22 also comprises a list of the processing resources required for each type of connection. In an embodiment of the invention, each server has a separate list of required processing resources (possibly part of table 1) according to the particular capabilities of the server (not shown).

Table 1 possibly includes for each server 24 a list of the connections currently handled by the server (line 5, the numbers represent identities of connections) and/or the number of connections of each type handled by the server. Alternatively or additionally, table 1 lists the utilized and/or available (line 4) processing power of the server.

In some embodiments of the invention, each time a connection is assigned to a server 24 and each time a connection is terminated, channel router 22 updates the server table so as to keep track of the available processing resources of each server 24. Possibly, servers 24 send updates also when the resources required to handle a currently handled connection change, for example, when the rate of a modem connection changes. Alternatively or additionally, some or all of servers 24 send updates to router 22, which updates are used to update the server table. Possibly, the updates include the currently available processing resources of the server. Alternatively or additionally, the updates include listings of the connections currently handled by the servers 24.

In some embodiments of the invention, the updates are sent periodically every predetermined amount of time, such as every few seconds or minutes. Alternatively or additionally, the updates are sent each time there is a substantial change in the available processing resources of a server and/or in the number of connections handled by the server. Further alternatively or additionally, servers 24 send updates at rates determined according to the importance of their updates to the routing decisions made by router 22. The importance of the updates may be a function of the types of connections handled by the servers 24 and/or of the available processing resources of the servers. For example, in an exemplary embodiment of the invention, servers which have little available processing resources send frequent updates to channel router 24 while servers which have a large amount of available processing resources send updates less frequently.

In some embodiments of the invention, channel router 22 prompts servers 24 for the updates. Optionally, each time an incoming connection is received, router 22 prompts for updates those servers 24 which are candidates to handle the connection. Alternatively or additionally, router 22 prompts servers 24 without relation to the incoming connections.

Figure 2:
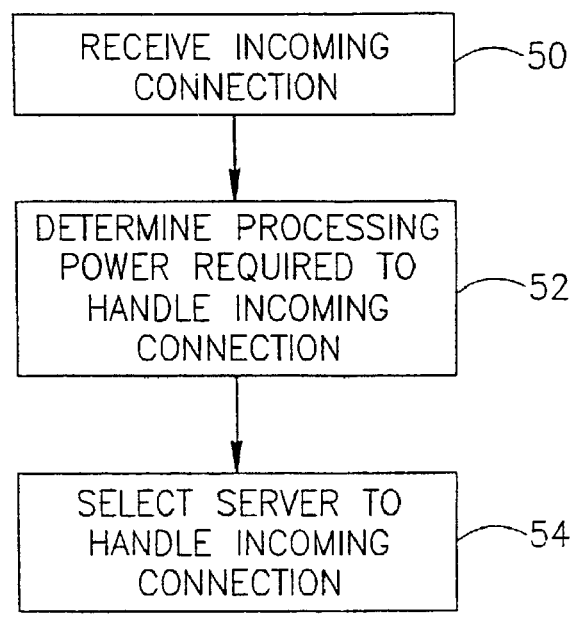
FIG. 2 is a flow chart of the actions performed by a channel router in handling an incoming connection, in accordance with an exemplary embodiment of the present invention.

FIG. 2 is a flow chart of the actions performed by channel router 22 for an incoming connection, in accordance with an embodiment of the present invention. In some embodiments of the invention, upon receiving (50) an incoming connection by channel router 22, the router determines (52) the processing resources required to handle the incoming connection. Responsive to the required processing resources, channel router 22 possibly selects (54) a server 24 to handle the incoming connection.

In some embodiments of the invention, the required processing resources are determined based on the type of the incoming connection, e.g., Fax, voice, Fax over IP (FoIP), VoIP, video, modem, and xDSL. Optionally, the required processing resources are determined based on other connection attributes, such as, connection speeds, allowed delays (average, maximal), quality of service (QoS), class of service and encoding schemes of the data on the connection. The type of connection is possibly determined using any method known in the art, such as by automatic call identification and/or by using different telephone numbers for different types of connections and/or for connections with different attributes.

In some embodiments of the present invention, incoming connections are referred to a temporary server 24 which begins handling the connection. Router 22 monitors the connection in order to determine the type of the connection and/or the processing resources required to handle the connection. After a server 24 to handle the connection is selected (54), the connection is re-routed to the selected server, while the connection is being handled.

In an embodiment of the invention, the processing resources include one or more of processing power, memory, and connection bandwidth. The processing power required to handle a connection refers to a number of instructions per second which need to be performed in order to handle the connection and/or to an amount of time required to handle the connection per time unit. The processing power may be measured, for example, in MIPS, clock cycles and/or time. The processing power of a server 24 refers to the number of instructions the server can perform per second or to a similar measure. The connection bandwidth of a server 24 refers to the maximal amount of bandwidth the connection may receive along the links entering the server. The bandwidth may be referred to in some systems using numbers of PCM time slots.

It is noted that in some embodiments of the invention there are a plurality different combinations of processing resources which can handle the same connection. In some embodiments of the present invention, the processing power required to handle a connection is a function of the memory allocated to the handling of the connection. That is, a certain connection may require x processing power if the connection is allocated y memory bytes and 2× processing power if the connection is allocated y/2 memory bytes. In this embodiment, the determining (52) of the processing resources comprises determining a plurality of resource combinations which are sufficient to handle the connection.

In some embodiments of the invention, router 22 determines (52) the required processing resources by consulting a look up table. Alternatively or additionally, the required processing resources are calculated as a function of the type of the connection and the other attributes of the connection.

In some embodiments of the invention, all of servers 24 require substantially the same amount of processing resources to handle the same connection. In this embodiment, channel router 22 possibly manages a single look up table from which the required processing resources are determined. In another embodiment of the invention, for example in which one or more of servers 24 are optimized for specific types of connections, the server-table lists for each server, the processing power required for each type of connection and for each different attribute value.

Referring in more detail to selecting (54) a server 24 to handle the incoming connection, the selected server 24 is possibly one which can handle the specific type of the incoming connection, and has sufficient available processing resources to do so (at least the determined processing resources of the incoming connection). In some embodiments of the invention, the selection is performed using theoretical models, such as packing theory methods, in order to maximize the chances that at least one of servers 24 will have sufficient processing resources to handle subsequent incoming connections.

For example, in an embodiment of the present invention, channel router 22 gives first precedence to selecting a server 24 which has sufficient available processing power to handle the incoming connection but does not have sufficient available processing power to handle connections which require more processing power.

In some embodiments of the invention, router 22 attempts to leave available resources on servers 24 which are handling connections which are not utilizing maximal resources. For example, a server 24 which is handling a plurality of modem connections which are not working at their maximal speed is optionally left (if possible) with available resources to allow for higher modem rates, if required at a later time.

In some embodiments of the present invention, router 22 stores incoming connection statistics, for example as a function of the time and/or date, and accordingly router 22 performs the connection assignments to servers 24. For example, if it is known that during the night most incoming connections are modem connections router 24 will attempt to leave room in servers 24 for as many as possible modem connections rather than leaving room for Fax and voice connections.

In some embodiments of the present invention, the selection of a server 24 is performed based on the priorities of the various incoming connections. That is, router 22 maximizes the chances that connections of high priority will be handled. Connections of high priority, may be for example, connections of a certain type or connections from a certain caller. Alternatively or additionally, the selection of server 24 is performed to meet required QoS and classes of service of incoming connections.

In some embodiments of the present invention, the selection of servers 24 to handle the incoming connections is performed in a manner which attempts to achieve an even distribution of the connections between the servers. An even distribution distributes the damage in case one of servers 24 suddenly fails. Alternatively to attempting to achieve an even distribution of all the connections, those connections which require high classes of service, e.g., high reliability, are divided evenly between servers 24 and the rest of the connections are divided according to other criteria. High reliability connections are possibly defined according to QoS and/or according to the type of the connection. For example, failure of VoIP connections is usually considered more annoying than failure of Fax connections and therefore VoIP connections require higher reliability.

Alternatively to dividing some or all of the connections evenly, servers 24 are graded according to their reliability, and the number of connections assigned to specific servers 24 is determined according to the reliability of the servers.

In some embodiments of the present invention, incoming connections may be serviced at different levels of service resulting in different usage levels of the resources of server 24. For example, modem connections may be handled at different rates. Possibly, in times when a large number of connections are expected, router 22 assigns lower levels of service to connections of low QoS and/or of types which are less urgent. Thus, router 22 leaves resources for incoming high priority connections.

In some cases, none of servers 22 have sufficient available resources to handle an incoming connection. In an exemplary embodiment of the invention, upon receiving a connection of high priority when none of servers 24 have sufficient available resources to handle the connection, router 22 instructs one of servers 24 to lower the rate of one or more connections to make room for the newly coming high priority connection.

Alternatively or additionally, upon receiving a connection which requires an amount of resources which is not available on any of servers 24, router 22 re-routes between the servers one or more connections which are in progress, in order to accumulate free resources on a single server which could handle the newly received connection. For example, two servers 24 may each have available resources which equal half the available resources required for a modem connection. Assuming a Fax connection requires half the resources of a modem connection, each one of these two servers 24 could handle an additional Fax connection. Therefore, router 22 possibly re-routes a Fax connection from one of the two servers to the other, freeing the required resources on the former server 24 to handle the incoming modem connection.

In some embodiments of the invention, some or all of servers 24 have a common memory (not shown) in which status information of the connections, is stored. When a router 22 determines that a connection is to be transferred from a first server 24 to a second server 24 while the connection is being handled, router 22 instructs the first server 24 to stop processing the connection. The first server 24 optionally performs a final handling session of the connection and then acknowledges to the router that it is not handling the connection. Alternatively, the first server 24 immediately acknowledges that it is not handling the connection. Optionally in this alternative, if the first server 24 is in the middle of a handling session of the connection it first finishes the handling session. Thereafter, router 22 instructs the second server 24 to handle the connection. Optionally, the second server 24 immediately performs a processing session of the newly received connection. Alternatively, the connection is posted to wait its turn according to regular scheduling methods. Alternatively or additionally, other methods for transferring a connection between servers 24 may be used, such as described in relation to processors of a DSL modem pool in PCT application PCT/IL00/00266, filed May 9, 2000, the disclosure of which is incorporated herein by reference.

Possibly, the methods described above for selecting (54) a server 24 for handling incoming connections, apply also to selecting servers for re-routed connections. The connections for which a server 24 is chosen may be re-routed for any reason, such as to make room for an incoming connection as described above and/or in case a server 24 fails and some or all of the connections it handled are re-routed. In some embodiments of the invention, router 22 determines periodically for each of servers 24 to which other servers its connections will be re-routed in case the server fails. Possibly, router 22 may operate in a backup mode in which servers 24 have at any time sufficient resources to handle the connections of one of the servers which fails and there exists a re-routing scheme which can re-route the connections of the failed server to the other servers. Possibly, in the backup mode router 22 routes the incoming connections accordingly and declines connections if necessary.

Possibly, in the backup mode there is a re-routing scheme for the failure of any of servers 24. Alternatively, there is a re-routing scheme only for a sub-group of servers 24. Possibly, high priority connections are routed to servers 24 in the sub-group. In some embodiments of the invention, only a predetermined percentage of the connections on any single server 24 are included in the re-routing scheme in the backup mode. That is, router 22 will ensure that in case a server 24 fails while the router operates in the backup mode, that at least the predetermined percentage of the connections of the failing server will be able to be re-routed to other servers 24.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. Variations of embodiments described will occur to persons of the art. Furthermore, the terms "comprise," "include," "have" and their conjugates, shall mean, when used in the claims, "including but not necessarily limited to." The scope of the invention is limited only by the following claims:

The invention claimed is:

1. A method of channel routing, comprising:
   receiving a plurality of connections having different attributes requiring different amounts of processing resources and assigning them to remote access servers in a pool of remote access servers;
   receiving a specific incoming connection;
   determining an amount of processing resources required to handle the specific incoming connection, responsive to at least one attribute of the specific incoming connection;
   selecting from the pool a remote access server to handle the specific incoming connection, responsive to the defined amount of processing resources and a priority of the specific incoming connection;
   requesting from the selected remote access server to lower the amount of processing resources assigned to one or more currently handled connections in order to vacate resources for the received incoming connection; and
   rerouting a connection from the selected remote access server to a different server, in order to make room for the incoming connection to be handled entirely by the selected remote access server.

2. A method according to claim 1, wherein determining the amount of processing resources comprises determining an amount of processing power.

3. A method according to claim 2, wherein determining the amount of processing power comprises selecting an amount of processing power from a look up table.

4. A method according to claim 1, wherein determining the amount of processing resources comprises determining an amount of memory.

5. A method according to claim 1, wherein determining the amount of processing resources comprises determining a plurality of suitable combinations of resources.

6. A method according to claim 1, wherein determining the amount of processing resources comprises determining responsive to a type of the received incoming connection.

7. A method according to claim 1, wherein determining the amount of processing resources comprises determining responsive to a quality of service of the received incoming connection.

8. A method according to claim 1, wherein determining the amount of processing resources comprises determining separately for each remote access server responsive to capabilities of the remote access server.

9. A method according to claim 1, wherein selecting the remote access server comprises determining an amount of available processing resources for each of a plurality of remote access servers.

10. A method according to claim 9, wherein determining the amount of available processing resources for each of the remote access servers comprises receiving indications of the available processing power from the remote access servers.

11. A method according to claim 10, wherein receiving indications of the available processing resources comprises receiving indications periodically irrespective of the receiving of the incoming connection.

12. A method according to claim 9, wherein determining the amount of available processing resources for each of the remote access servers comprises keeping track of the assignment of connections to be handled by the servers.

13. A method according to claim 1, wherein selecting the remote access server comprises selecting based ton packing theory.

14. A method according to claim 1, wherein selecting a remote access server comprises selecting at least partially according to statistics of previously received connections.

15. A method according to claim 1, wherein determining the amount of processing resources comprises determining responsive to the encoding scheme used for the specific incoming connection.

16. A method according to claim 1, wherein determining the amount of processing resources comprises determining responsive to whether the connection is a voice, fax or modem connection.

17. A method according to claim 1, wherein receiving the plurality of connections comprises receiving connections of different types using different encoding schemes.

18. A switch system which handles incoming connections, comprising:
   a plurality of remote access servers; and
   a channel router which is adapted to determine for each incoming connection an amount of processing resources required to handle the incoming connection and which is adapted to select one of the remote access servers to handle the connection, responsive to the determined amount of processing resource,
   wherein the channel router is adapted to instruct selected remote access servers to reduce the processing resources assigned to one or more currently handled connections of the server, without disconnecting the connection, in order to vacate resources for the received incoming connections, and reroute a connection from the selected remote access server to a different server, in order to make room for the incoming connection to be handled entirely by the selected remote access server.

19. A system according to claim 18, wherein the plurality of remote access servers comprises at least one software based server.

20. A system according to claim 18, wherein the plurality of remote access servers comprises at least one server which can handle connections of a plurality of different types.

21. A system according to claim 18, wherein at least one of the plurality of remote access servers sends updates relating to the available resources of the at least one server to the channel router.

22. A system according to claim 18, wherein the channel router manages a table of the available resources of each of the plurality of servers.

23. A system according to claim 18, wherein at least one of the servers comprises an array of servers managed by an internal channel router.

* * * * *